US005624968A

United States Patent [19]
Gabbard

[11] Patent Number: 5,624,968
[45] Date of Patent: Apr. 29, 1997

[54] FLEXIBLE WATER-BLOWN POLYURETHANE FOAMS

[75] Inventor: James D. Gabbard, Maryland Heights, Mo.

[73] Assignee: Monsanto Company, St. Louis, Mo.

[21] Appl. No.: 454,790

[22] Filed: May 31, 1995

Related U.S. Application Data

[62] Division of Ser. No. 96,806, Jul. 26, 1993, Pat. No. 5,457, 139.

[51] Int. Cl.$^6$ .............................. C08J 9/12; C08G 18/34
[52] U.S. Cl. ........................... 521/107; 521/130; 521/131
[58] Field of Search ................................. 521/131, 107, 521/130

[56] References Cited

U.S. PATENT DOCUMENTS

| | | | |
|---|---|---|---|
| 3,772,222 | 11/1973 | Steward et al. | 260/2.5 |
| 4,169,922 | 10/1979 | Brown et al. | 521/155 |
| 4,196,268 | 4/1980 | Brown et al. | 521/130 |
| 4,241,189 | 12/1980 | Sheldon et al. | 521/918 |
| 4,262,093 | 4/1981 | Brown et al. | 521/107 |
| 4,275,171 | 6/1981 | Wegner | 521/107 |
| 4,287,307 | 9/1981 | Hostettler | 521/51 |
| 4,293,658 | 10/1981 | Raden et al. | 521/129 |
| 4,349,640 | 9/1982 | Keeney et al. | 524/294 |
| 4,363,882 | 12/1982 | Wegner | 521/108 |
| 4,433,089 | 2/1984 | Keeney et al. | 524/294 |
| 4,544,678 | 10/1985 | Fesman | 521/107 |
| 4,605,684 | 8/1986 | Pcolinsky | 521/107 |
| 4,621,106 | 11/1986 | Fraccossi et al. | 521/99 |
| 4,812,356 | 3/1989 | Meyer et al. | 428/220 |
| 4,980,388 | 12/1990 | Harrington et al. | 521/130 |
| 5,028,635 | 7/1991 | Nodelman | 521/130 |
| 5,039,712 | 8/1991 | Brock | 521/130 |
| 5,124,369 | 6/1992 | Vandichel et al. | 521/130 |
| 5,130,345 | 7/1992 | Li et al. | 521/131 |
| 5,164,417 | 11/1992 | Anderson | 521/107 |
| 5,232,956 | 8/1993 | Gabbard et al. | 521/107 |

FOREIGN PATENT DOCUMENTS

| | | |
|---|---|---|
| 932098 | 8/1973 | Canada . |
| 345678 | 12/1989 | European Pat. Off. . |
| 226034 | 12/1984 | Japan . |

*Primary Examiner*—Morton Foelak
*Attorney, Agent, or Firm*—Fitzpatrick, Cella, Harper & Scinto

[57] ABSTRACT

A flexible plasticized polyurethane foam is taught in which water is used as the foaming agent and a plasticizer selected from phosphate ester, phthalate and benzoate plasticizers is added to improve the softness and flexibility of the polyurethane.

11 Claims, No Drawings

FLEXIBLE WATER-BLOWN POLYURETHANE FOAMS

This application is a division of U.S. patent application Ser. No. 08/096,806 which was filed Jul. 26, 1993, now U.S. Pat. No. 5,457,139.

This invention relates to the use of plasticizers in water-blown polyurethane foams to produce a flexible foam. More specifically, this invention relates to the use of phthalate plasticizers, phosphate ester plasticizers and benzoate plasticizers in water-blown polyurethane foams produced using toluene diisocyanate (TDI).

BACKGROUND OF THE INVENTION

Polyurethane foams and methods for producing them are generally selected based upon the contemplated end use. Polyurethane foams produced from the reaction of polyols and toluene diisocyanate (TDI) are generally soft and flexible and they have thus been used when flexibility is required. In the past, greater than 80% of the toluene diisocyanate produced has been used to produce flexible foams. Polyurethane foams produced from the reaction of polyols and diphenylmethane diisocyanate are generally rigid and they have been used when strength and support have been required. In the past, 75% of the diphenylmethane diisocyanate produced has been used to produce rigid foams.

To produce a foam during the reaction of the polyol and the isocyanate, a foaming or blowing agent must be included in the reaction mixture. Fluorocarbon compounds, such as trichlorofluoromethane, have been used because they expand easily when heated and they do not react with the polyol and isocyanate. Fluorocarbon compounds continue to be used in the production of some rigid foams; however, methylene chloride has displaced most of the fluorocarbon compounds in the production of flexible foams. Water is also used as a foaming agent. Water reacts with the isocyanate to form an unstable acid which decomposes into carbon dioxide that creates the desired foaming. However, the reaction of the water and isocyanate has an undesired affect upon the reaction of the isocyanate and polyols such that the polyurethane produced is more rigid, or harder, than it would be if the water were not present. This undesired hardening of the foam has limited the use of water as the foaming agent in the production of flexible polyurethane foams.

In Japanese patent application 59-226034, published Dec. 19, 1984, a method for manufacturing a foamed urethane molded article is described. A urethane foam is produced from the reaction of a polyol and an isocyanate compound using both a fluorocarbon compound and a small amount of water as the foaming agents. Both toluene diisocyanate (TDI) and p,p'-diphenylmethane diisocyanate (MDI) were used as the isocyanate compound. A phthalic acid plasticizer, such as the specifically discussed di-2-ethylhexyl phthalate (DOP), butyl benzyl phthalate (BBP), and dibutyl phthalate (DBP), was added to the reaction to reduce the lower mold temperature required for molding the desired articles. This Japanese application teaches the production of rigid foams, as shown by the sphere penetration test; and the plasticizers are added to reduce the required mold temperature.

BRIEF DESCRIPTION OF THE INVENTION

A soft, flexible, plasticized polyurethane foam composition is produced from the reaction of a polyol and toluene diisocyanate by adding a plasticizer selected from the group of alkyl benzyl phthalates, phosphate esters and benzoates to the reaction compounds. A non-halogen containing foaming agent, preferably water or a gas such as carbon dioxide, is used to foam the polyurethane composition.

DETAILED DESCRIPTION OF THE INVENTION

In the past polyurethane foams produced from toluene diisocyanate have been relatively soft and flexible. However, the use of water as a foaming agent in the production of such polyurethane foams has contributed to producing a stiffer, harder and more rigid polyurethane foam. In order to retain the softness desired in the toluene diisocyanate based polyurethane foams, the concentration of water in the formulation has been decreased or eliminated and inert physical blowing agents, such as trichlorofluoromethane or methylene chloride, have been included.

This invention has overcome these problems to produce a soft, flexible, plasticized polyurethane foam composition from the reaction of a polyol and toluene diisocyanate by adding a plasticizer selected from the group of alkyl benzyl phthalate plasticizers, phosphate ester plasticizers and benzoate plasticizers to the reaction compounds. A non-halogen containing foaming agent, preferably water or a non-halogen containing gas such as carbon dioxide, is used to foam the polyurethane compound.

Toluene diisocyanate is a basic raw material in the production of polyurethane foams. Almost 80% of the toluene diisocyanate is used in the production of flexible foams and the remainder is used to produce a variety of products including insulation, adhesives and coatings. Typical formulations contain from 40 to 50 parts of toluene diisocyanate per one hundred parts of polyol, and the toluene diisocyanate content averages about 28% by weight of the foam that is produced. The polyols used in these formulations are primarily polyether triols based upon glycerine, but other polyols are also used.

The predominant toluene diisocyanate is "TDI-80" which is an 80:20 mixture of the 2,4 and 2,6 isomers of toluene diisocyanate. Toluene dissocyanate is produced by the phosgenation of an 80:20 mixture of the 2,4 and 2,6 isomers of toluene diamine obtained by the reduction of a mixture of dinitrotoluenes. The initial products of the nitration of toluene are a mixture of ortho- and para- mononitrotoluene. If these isomers are separated, further nitration of the ortho isomer yields a 65:35 mixture of the 2,4 and 2,6 dinitrotoluene. In practice the mononitrotoluenes are not separated, and the nitration of this mixture yields the 80:20 mixture of 2,4 and 2,6 dinitrotoluene. Reduction provides the corresponding mixture of diamines, which is then reacted with phosgene to yield "TDI-80", toluene diisocyanate. Virtually all of the toluene diisocyanate reacts mono-functionally as the para isocyanate group is more reactive than the ortho isocyanate group. Toluene diisocyanate can also be produced directly from dinitrotoluene and carbon monoxide. However, that process requires more energy than the present process and has, thus, been less feasible.

The other basic raw material for the production of polyurethane foams is the polyol that will react with the isocyanate. This polyol may be a polyether polyol, a polyester polyol, or a polyol chain extender.

Polyether polyols are most commonly used in the production of polyurethane foams. Representative examples of polyether polyols are polyether diols such as polypropylene glycol, polyethylene glycol and polytetramethylene glycol; polyether triols such as glycerol triols; polyether tetrols and pentols such as aliphatic amine tetrols and aromatic amine tetrols; polyether octols such as sucrose octol; and others such as sorbitol, trimethylol propane, and pentaerythritol.

Polyurethane foams are the largest single outlet for polyester polyols. Representative examples of polyester polyols used to make polyurethane foams are ethylene and diethylene glycol adipates, butanediol adipate, polytetramethylene glycol adipate, Hexanediol adipate, and the polyols produced by the products from dimethyl terephthalate production reacted with diols and triols.

Polyol chain extenders are used to react to increase the length of the carbon chains in the polyurethane foam compositions. The polyol chain extenders may be monomeric short chain diols or triols such as 1,4-butanediol, ethylene glycol and hydroquinone di(ethylether) or primary diamines such as ethylene diamine, hydrazine, 3,5-diethyl toluenediamine (DETDA) and methylene bis-orthochloraniline (MOCA).

In addition to the isocyanate and the polyol, the production of polyurethane foam requires the presence of a foaming or blowing agent. Fluorocarbon blowing agents such as trichlorofluoromethane have been used to produce foams; however, the future of the fluorocarbon blowing agents depends upon government regulations. The heat of reaction, and sometime externally applied heat, causes expansion of the fluorocarbon compound when it is used as the foaming agent. Methylene chloride has displaced most of the fluorocarbon compounds in the production of flexible foams. However, it is becoming more desirable to remove all halogen compounds from the process. Therefore, non-halogen containing gases such as carbon dioxide may be used. A common foaming agent, and the preferred agent for the process of this invention is water. Frequently water and an auxiliary blowing agent such as methylene chloride are used together. Water added to the reaction of the isocyanate and polyol reacts with the isocyanate to form an unstable carbamic acid which decomposes to the corresponding amine and carbon dioxide. The amine reacts with another isocyanate group to form a symmetrical disubstituted urea. Either hydrogen of the disubstituted urea may react further with another isocyanate to form a biuret which provides additional polymer branching or crosslinking. The reaction of the isocyanate and the polyol is exothermic. When, as preferred in this invention, water is provided as the foaming agent, the water/isocyanate reaction generates carbon dioxide which expands to provide the expansion or foaming of the polyurethane being produced. One of the main problems involved in replacing the ozone-depleting fluorocarbon compound as blowing agent in flexible polyurethane foams with water is the increased firmness of the resulting foams. This is due to the rigid urea groups introduced as a result of the water-isocyanate reaction. With toluene diisocyanate based flexible foams, this problem is compounded because they are selected for their softness and flexibility and the increased stiffness makes the foams less desirable. One method, as found in this invention, to obtain softer water-blown foams is to use plasticizers.

Other materials are commonly added to the polyurethane during production to reduce problems during production or to provide desired properties in the polyurethane product. Among the additives are catalysts such as amines and metal salts, cell regulators or surfactants such as silicones to aid thorough mixing of the ingredients and to regulate cell growth, fire retardants when they are needed, and stabilizers and antioxidants such as hindered amine light stabilizers and benzotriazoles.

The use of water as the foaming agent in flexible polyurethane foams increases the firmness of the resulting foams. This invention has found that plasticizers may be added to produce a softer, more flexible polyurethane foam which, more importantly, displays good load bearing properties without significant loss of the other required strength properties.

The effect of varying levels of plasticizers (from 0 to 20 parts by weight based upon the weight of the polyol) on the properties of toluene diisocyanate (TDI) based water-blown polyurethane foams is shown in the following tables. In the examples shown below, the plasticizer is added to the composition in the amounts of 10 and 20 parts by weight. While this range is the most preferred, it is recognized that less plasticizer, such as amounts less than 1 part by weight, may be added and that this reduced amount of plasticizer will provide softening effect upon the composition.

It is also recognized that greater amounts of plasticizer may be desired in the composition and that 100 parts by weight of plasticizer per 100 parts by weight of polyol may be used and that a particular product may require as much as 150 parts by weight of plasticizer per 100 parts by weight of polyol. Plasticizers in this invention are phthalate plasticizers such as, for example, alkyl aryl phthalates, or alkyl benzyl phthalates, including butyl benzyl phthalate, alkyl benzyl phthalate wherein the alkyl group has a carbon chain of from seven to nine carbon atoms, Texanol benzyl phthalate, alkyl phenyl phthalate, symmetrical and unsymmetrical dialkyl phthalates including diisononyl phthalate, diisodecyl phthalate, dioctyl phthalate, dihexyl phthalate, diheptyl phthalate, butyloctyl phthalate, linear dialkyl phthalate wherein the alkyl groups are independently carbon chains having from seven to eleven carbon atoms, and butyl cyclohexyl phthalate; and phosphate ester plasticizers such as, for example, 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate and isopropylated triphenyl phosphate; and benzoate plasticizers such as, for example, Texanol benzoate, glycol benzoate, propylene glycol dibenzoate, dipropylene glycol dibenzoate and propylene glycol dibenzoate.

Free rise foams were prepared at varying densities. The load bearing properties of the foam, as well as the energy absorbing abilities were studied.

EXAMPLES

A. Chemicals

The chemicals employed in the preparation of foams are listed in Table 1. All chemicals were used as obtained from suppliers.

B. Preparation and Testing

The foams were prepared at ambient temperature, by the one-shot method, using a high speed laboratory stirrer. The foaming process was followed by measuring the cream, rise, and tack free times. Prior to testing the foams were allowed to age for seven days at room conditions.

The tests for foam density and Compression Force Deflection (CFD) were performed using ASTM D 3574–86. In addition, the Indentation Force Deflection (IFD) was measured according to ASTM D 3453–80 and the Sag Factor for the foam was calculated from the measured data.

C. Formulations

The basic formulation selected for this study for the toluene diisocyanate based water blown flexible foam is shown in Table 2, in column No. 1. The formulation was based on polyoxypropylene triol (Pluracol 726) and toluene diisocyanate (Lupranate T-80)(TDI). The foams were prepared at varying levels of plasticizers (10 and 20 parts by weight). In the table, the formulation component amounts are expressed in parts by weight (pbw) compared to the weight of the polyol in the composition.

D. Miscibility

The plasticizers exhibited excellent compatibility with the polyol Pluracol 726 and resulted in a significant decrease in viscosity at the ratio of 100 parts by weight (pbw) of Pluracol 726 to 10 to 20 parts by weight (pbw) of plasticizers.

E. Density

The foam density increased slightly in the presence of plasticizers in the formulation. This is as expected since the quantity of the blowing agent remained the same. With 20 parts by weight of plasticizers the density slightly increased as a result of the weight increase.

F. Firmness and Load Bearing Properties

The plasticizers of this invention were found to be very effective in decreasing the firmness of toluene diisocyanate based water blown foams, as measured by normalized compression force deflection (CFD). Even with 10 parts by weight (pbw) of plasticizer a decrease of normalized CFD values resulted. This effect was increased with increasing plasticizer level, as shown for example, for the isodecyl diphenyl phosphate plasticizer, Santicizer 148®. Most importantly the IFD (indention force deflection) sag factor didn't decrease with the presence of plasticizers, even though softer foams were obtained.

TABLE 1

Materials and Suppliers

| Designation | Description | Suppliers |
| --- | --- | --- |
| Pluracol @ 726 | Poloxypropylene triol, eq. wt. = 2244 | BASF Corp. |
| Dabco @ 33LV | 33% Triethylene diamine 67% dipropylene glycol | Air Prod. & Chemicals, Inc. |
| T-9 | Tin-Catalyst | Air Prod. & Chemicals, Inc. |
| DC-198 | Silicone surfactant | Dow Corning Corp. |
| Lupranate T-80 | Toluene diisocyanate (2,4/2,6 = 80/20) | BASF Corp. |
| Santicizer 141 | 2-Ethylhexyl diphenyl phosphate | Monsanto Company |
| Santicizer 148 | Isodecyl diphenyl phosphate | Monsanto Company |

TABLE 2

The Effect of Plasticizers on the Properties of TDI Based Flexible Foams

| Designation | 1 | 2 | 3 | 4 |
| --- | --- | --- | --- | --- |
| Formulation (pbw) | | | | |
| Pluracol 726 | 100 | 100 | 100 | 100 |
| Water | 3.4 | 3.4 | 3.4 | 3.4 |
| Dabco 33LV | 0.20 | 0.20 | 0.20 | 0.20 |
| T-9 | 0.14 | 0.14 | 0.14 | 0.14 |
| DC-198 | 1.3 | 1.3 | 1.3 | 1.3 |
| Plasticizer | — | S-148 10 | S-141 20 | S-148 20 |
| Lupranate T-80 | 43 | 43 | 43 | 43 |
| Isocyanate Index | 103 | 103 | 103 | 103 |
| Properties | | | | |
| Density (Kg/cm$^3$) | 33.64 | 35.24 | 40.04 | 38.44 |
| CFD (5 × 5 × 5 cm.) | | | | |
| 25% (KPa) | 4.89 | 4.41 | 4.48 | 4.48 |
| 50% (Kpa) | 6.55 | 6.27 | 6.48 | 5.93 |
| 65% (KPa) | 8.82 | 8.82 | 9.09 | 8.96 |
| Normalized CFD | | | | |
| 25% [(KPa)/(Kg/cm$^3$)] | 0.15 | 0.12 | 0.11 | 0.12 |
| 50% [(KPa)/(Kg/cm$^3$)] | 0.19 | 0.18 | 0.16 | 0.15 |
| 65% [(KPa)/(Kg/cm$^3$)] | 0.26 | 0.25 | 0.23 | 0.23 |
| IDF (5 cm. Thickness) | | | | |
| 25% (KPa) | 5.72 | 4.34 | 5.44 | 5.58 |
| 65% (KPa) | 9.03 | 8.20 | 10.13 | 9.78 |
| Sag Factor | 1.61 | 1.94 | — | 1.79 |

The addition of the plasticizers of this invention to water blown toluene diisocyanate based polyurethane foams produced a softer, more flexible polyurethane foam which, more importantly, displayed good load bearing properties without significant degradation of the other required strength properties.

It will be apparent from the examples that many other variations and modifications may be made in the compositions and processes described without departing from the concept of the invention. Accordingly, it should be understood that the description and examples are illustrative only and are not intended to limit the scope of the invention.

I claim:

1. A flexible plasticized polyurethane foam comprising a foamable polyurethane compound produced by the reaction of a polyol and toluene diisocyanate, an amount of a non-halogen containing foaming agent sufficient to produce a foam from said polyurethane compound and a non-halogen containing plasticizer selected from the group consisting of phthalate plasticizers and phosphate ester plasticizers, said foam having a higher sag factor and lower normalized CFD than an equivalent polyurethane foam without plasticizer.

2. The flexible plasticized polyurethane foam of claim 1 wherein said non-halogen containing foaming agent is water or a non-halogen containing gas.

3. The flexible plasticized polyurethane foam of claim 2 wherein said non-halogen containing foaming agent is water.

4. The flexible plasticized polyurethane foam of claim 1 wherein said non-halogen containing plasticizer is a phosphate ester.

5. The flexible plasticized polyurethane foam of claim 4 wherein said phosphate ester is selected from the group consisting of 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate and isopropylated triphenyl phosphate.

6. The flexible plasticized polyurethane foam of claim 5 wherein said phosphate ester is selected from the group consisting of 2-ethyl hexyl diphenyl phosphate and isodecyl diphenyl phosphate.

7. The flexible plasticized polyurethane foam of claim 1 wherein said phthalate plasticizer is selected from the group consisting of diisononyl phthalate, dihexyl phthalate, diheptyl phthalate, butyl octyl phthalate, linear dialkyl phthalate wherein said alkyl groups are independently carbon chains having from seven to eleven carbon atoms, and butyl cyclohexyl phthalate.

8. The flexible plasticized polyurethane foam of claim 1 wherein said non-halogen containing plasticizer is an alkyl aryl phthalate.

9. The flexible plasticized polyurethane foam of claim 8 wherein said alkyl aryl phthalate is selected from the group consisting of butyl benzyl phthalate, alkyl benzyl phthalate wherein said alkyl group has a carbon chain having from seven to nine carbon atoms, and Texanol benzyl phthalate.

10. A flexible plasticized polyurethane foam comprising a foamable polyurethane compound produced by the reaction of a polyol and toluene diisocyanate, an amount of water sufficient to produce a foam from said polyurethane compound and phthalate plasticizer selected from the group consisting of butyl benzyl phthalate, alkyl benzyl phthalate wherein said alkyl group has a carbon chain having from seven to nine carbon atoms, texanol benzyl phthalate, diisononyl phthalate, dihexyl phthalate, diheptyl phthalate, butyloctyl phthalate, linear dialkyl phthalate wherein said alkyl groups are independently carbon chains having from seven to eleven carbon atoms, and butyl cyclohexyl phthalate, said foam having a higher sag factor and lower normalized CFD than an equivalent polyurethane foam without plasticizer.

11. A flexible plasticized polyurethane foam comprising a foamable polyurethane compound produced by the reaction of a polyol and toluene diisocyanate, an amount of water sufficient to produce a foam from said polyurethane compound and a phosphate ester plasticizer selected from the group consisting of 2-ethylhexyl diphenyl phosphate, isodecyl diphenyl phosphate, mixed dodecyl and tetradecyl diphenyl phosphate, mixed dodecyl and tetradecyl diphenyl phosphate, trioctyl phosphate, tributyl phosphate, butylphenyl diphenyl phosphate and isopropylated triphenyl phosphate, said foam having a higher sag factor and lower normalized CFD than an equivalent polyurethane foam without plasticizer.

\* \* \* \* \*